United States Patent Office 3,458,502
Patented July 29, 1969

3,458,502
ESTRATRIENE-[3,2-D]-PYRIMIDINES AND METHOD OF THEIR PREPARATION
Pietro de Ruggieri, Carmelo Gandolfi, and Umberto Guzzi, Milan, Italy, assignors to Ormonoterapia Richter S.p.A., a corporation of Italy
No Drawing. Filed Aug. 22, 1966, Ser. No. 576,175
Claims priority, application Italy, Aug. 23, 1965, 18,859/65
Int. Cl. C07c *173/10;* A61k *17/00*
U.S. Cl. 260—239.5                                       14 Claims

ABSTRACT OF THE DISCLOSURE

There are provided [3,2-d]-pyrimidines of steroids which are aromatic in ring A. The heterocycle may be substituted in the 2'- and/or 6'-positions by lower alkyl, phenyl, benzyl, hydroxy, mercapto, amino or lower alkoxy radicals or by chlorine, bromine or iodine atoms. The compounds of the invention have estrogenic, anticholesterolemic, hypophyse blocking and cortical activities.

This invention relates to the compounds of formula:

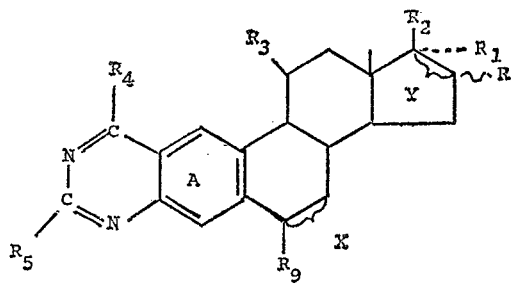

wherein the steroidal ring A, the one which is condensed with the pyrimidine ring, is an aromatic ring and can indifferently be the 1,3,5(10)-triene and the 2,4,10(1)-triene mesomer, wherein R is a member selected from the group consisting of hydrogen, α-, and β-chloro, α- and β-fluoro, α- and β-bromo, α- and β-iodo, α- and β-methyl, α- and β-ethyl, α- and β-propyl and α- and β-hydroxy, and α- and β-acyloxy, the acyl radical of which is derived from a saturated or unsaturated aliphatic acid having 2 to 10 carbon atoms; wherein $R_1$ is a member selected from the group consisting of lower alkyl, —CH=CH—$R_a$ where $R_a$ is a member selected from the group consisting of H, and lower alkyl, —C≡C—$R_a$ where $R_a$ is a member selected from the group consisting of H and lower alkyl, hydroxy, 2'-tetrahydropyranyloxy

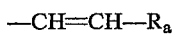

and acyloxy, the acyl radical of which is derived from a saturated or unsaturated carboxylic acid having 2 to 10 C atoms; wherein $R_2$ is a member selected from the group consisting of H, hydroxy, 2'-tetrahydropyranyloxy

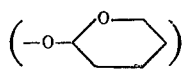

O-lower alkyl, acyloxy, the acyl radical of which is derived from a saturated and unsaturated aliphatic carboxylic acid having 2 to 10 C atoms and from phenylacetic, phenylpropionic, phenyl propiolic, (cis and trans) cinnamic, benzoic, salicylic and p-aminobenzoic acids, ortho-dimethoxy-ester (—O—C(OCH$_3$)$_2$—$R_a$) where $R_a$ is H and lower alkyl, ortho-diethoxy-ester (—O—C(OC$_2$H$_5$)$_2$—$R_a$)

where $R_a$ is H and lower alkyl, —O—COOCH$_3$,

—OCOOC$_2$H$_5$, —C$_8$H$_{17}$, —COCH$_3$

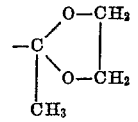

—COCH$_2$OH, —COCH$_2$O-acyl wherein acyl is an acyl radical derived from a saturated or unsaturated aliphatic acid having 2 to 10 C atoms and from phenylacetic, phenylpropionic, phenylpropiolic, (cis and trans) cinnamic, benzoic, salicylic and p-amino-benzoic acids; wherein $R_1$ and $R_2$ together are a bivalent radical selected from the group consisting of 17-keto, 17,17-ethylenedioxy, 17,17-methylenedioxy and 17α,20:20-bis-methylenedioxy; wherein $R_3$ is a member selected from the group consisting of hydrogen, hydroxy and keto; wherein $R_4$ and $R_5$ are each a member selected from the group consisting of hydrogen, lower alkyl, phenyl, benzyl, hydroxyl, SH, NH$_2$, O-lower alkyl, Cl, Br, and I; wherein $R_9$ is a member selected from the group consisting of H and methyl; and wherein X and Y are each a member selected from the group consisting of a single and a double bond.

These compounds, which are characterized by estrogenic, anticholesterolemic, hypophyse blocking and cortical activities, are prepared by successive dehydrogenation and aromatization in the presence of a hydrogen acceptor, which may be a methyl or ethyl ester, of maleic, fumaric, or cinnamic acid, a substituted ethylene compound such as styrene or stilbene, quinone, tetrachlorobenzoquinone, or 2,3 - dicyano-5,6-dichlorobenzoquinone (DDQ) in the presence or absence of a hydrogen transfer agent which may be Pd/C or Pt/C, in the presence of a solvent which may be benzene, dioxane, iso-octane, ethylene glycol, or mineral oil, of a starting compound of the formula:

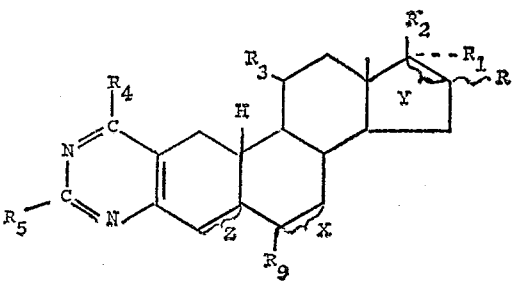

wherein R, $R_1$, $R_2$, singly and together, $R_3$ $R_4$, $R_5$, $R_9$, X and Y have the meanings given above and Z also represents a single or a double bond.

The [3,2-d]-pyrimidines of 1,3,5(10)-triene steroids, which are the products of this invention, are also prepared by starting from a compound of the formula:

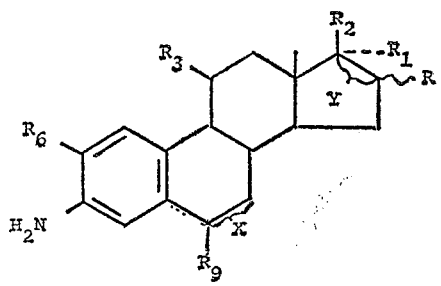

wherein the steroidal ring A is already aromatic and R, $R_1$ and $R_2$, singly and together, $R_3$, $R_9$, X and Y have the meanings given above and $R_6$ is a member selected from the group consisting of formyl, nitrile,

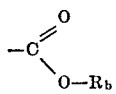

(where $R_b$ is a member selected from the group consisting of H, methyl, ethyl,

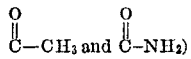

This preparation may be illustrated by the following equations:

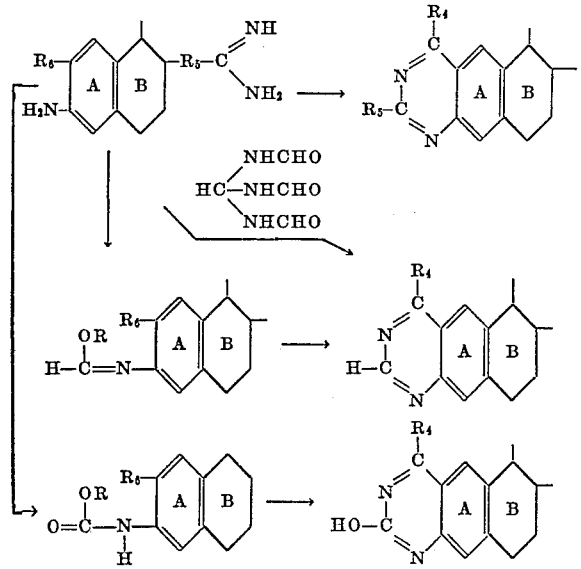

The steroidal 2-substituted 3-amino-1,3,5(10)-triene ($R_6$=formyl, nitrile, carboxy ester, carboxy amide, or acetyl) be reaction with tris-formyl-amino-methane gives a 6'-substituted ($R_4$=H, $NH_2$, OH, or $CH_3$) [3,2-d]-pyrimidine of a 1,3,5(10)-triene steroid; the same pyrimidines can be obtained from a 2-substituted steroidal 3-amino-1,3,5(10)-triene by reaction with ethyl orthoformate to obtain the corresponding 3-ethoxy-methylidene-amino derivative which is cyclized with ammonia to the 6'-substituted [3,2-d]-pyrimidine.

On the other hand, the reaction of the same 2-substituted steroidal 3-amino-1,3,5(10)-triene with methyl or ethyl chlorocarbonate leads to a 2-substituted 3-(N-methoxy-carboylamino) or 3-(N-ethoxy-carboylamino) 1,3,5(10)-triene steroid ($R_6$=formyl, nitrile, carboxy ester, carboxy amide, or acetyl), which, by condensation with ammonia, provides the 6'-substituted ($R_4$=H, $NH_2$, OH, or $CH_3$) [3,2-d]-2'-hydroxy-pyrimidine of a 1,3,5(10)-triene steroid. Lastly, by the reaction of a 2-substituted 3-amino-1,3,5(10)-triene steroid with the amidine of an aliphatic, aromatic or arylaliphatic carboxylic acid there is obtained a 2'-substituted [3,2-d]-pyrimidine ($R_4$=H, $NH_2$, OH, or $CH_3$) depending upon whether $R_6$ is formyl, nitrile, carboxy ester, carboxy amide, or acetyl. The 2'-substituent ($R_5$) is alkyl, phenyl and aralkyl depending on the selected amidine (acetamidine, $R_5$=$CH_3$; propionamidine, $R_5$=$C_2H_5$; benzamidine, $R_5$=$C_6H_5$; phenylacetamidine, $R_5$=$C_6H_5$—$CH_2$—, etc.).

A one-step reflux reaction in dry alcohols (particularly ethanol) of a steroidal 2-cyano-3-ethoxy-methylidene-amino-1,3,5(10)-triene with sodium hydrogen sulfide or potassium hydrogen sulfide leads to a steroidal [3,2-d]-6'-mercaptopyrimidine-1,3,5(10)-triene.

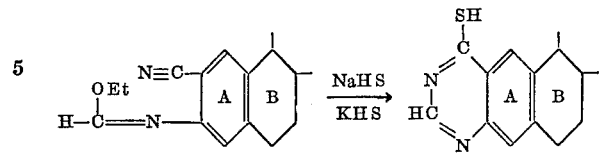

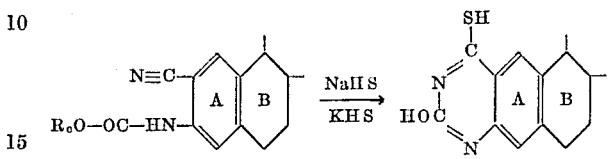

Analogously, according to the above scheme, from steroidal 2-cyano-3-ethoxy-carboyl-amino- and from 2-cyano-3-methoxy-carboyl-amino derivatives of 1,3,5(10)-triene, there are obtained [3,2-d]-2'-hydroxy-6'-mercapto-pyrimidines of steroidal 1,3,5(10)-triene.

The steroidal 2-carboxyester-3-amino-1,3,5(10)-triene are prepared according to the following reaction scheme, by dehydrogenation of a 2-carboxy ester of a 3-amino-2,4-diene derivative of a 19-nor-steroid with 2,3-dicyano-5,6-dichloro-benzoquinone in dioxane, or with diethyl maleate or styrene at the boiling point in dioxane in the presence of Pd/C or Pt/C, the 2,4-diene derivatives being obtained from a 2α-carboxy ester of $\Delta^4$-19-nor-3-ketosteroid by reaction with ammonium formate in refluxing ethanol:

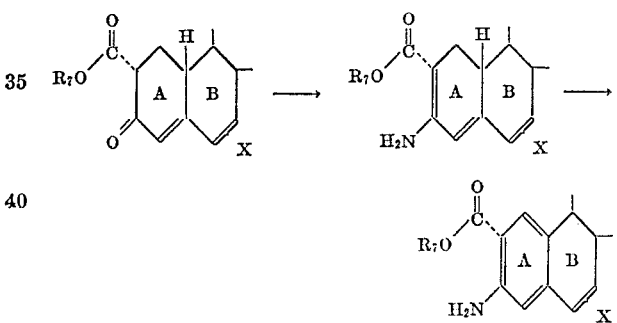

A steroidal 2-formyl-3-amino-1,3,5(10)-triene is prepared starting with a steroidal 2-cyano-3-amino-1,3,5(10)-triene by partial reduction of the nitrile to formyl in 100% formic acid with Raney Ni.

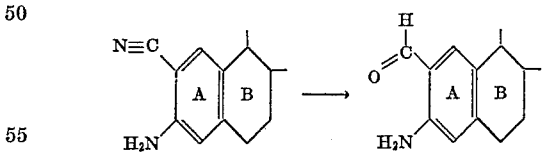

A 2-carboxyamido-3-amino derivative of a steroidal 1,3,5(10)-triene is prepared starting with a [3,2-c]-5'-amino-isoxazole of $\Delta^4$-19-nor-steroid by refluxing in dioxane with 10% Pd/C, either in the presence or absence of a hydrogen acceptor, such as ethyl maleate or styrene

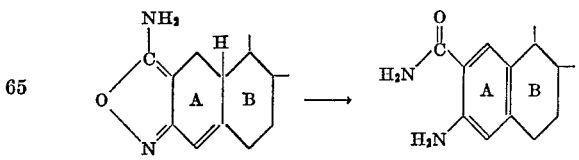

The following examples illustrate the invention but are not intended to limit it in any way:

Example 1.—Estra-1,3,5(10)-triene-17β-ol-[3,2-d]-
2'-hydroxy-6'-amino-pyrimidine 2.1 parts 2-cyano-3-(N-ethoxycarboyl)-aminoestra-1,3,5(10)-triene-17β-ol-17-acetate are added to an autoclave dissolved in 50 parts of ammonia-saturated absolute ethanol, warmed at 120° C. for 6 hours, cooled, and the precipitated product is filtered out. Crystallization from methylene chloride and ethyl acetate yields 1.58 parts estra-1,3,5(10)-triene-17β-ol-[3,2-d] - 2' - hydroxy-6'-amino-pyrimidine-17-acetate, M.P. 299–305° C., which is saponified by heating with a 2.5% potash methanolic solution. The solution is refluxed for 1 hour, concentrated to ⅓ of its volume, neutralized with 15% acetic acid and diluted with water. The precipitated product is filtered out and crystallized from ethanol to give 0.95 part estra- Example 2.—Estra-1,3,5(10)-triene-17β-ol-[3,2-d]-6'-amino-pyrimidine To a solution of 0.4 part 2-cyano-3-(N-ethoxymethyliden)-aminoestra-1,3,5(10)-triene-17β-ol-17-acetate in 10 1,3,5(10)-triene-17β-ol-[3,2-d] - 2' - hydroxy-6'-amino-pyrimidine, M.P. >340° C.
parts ethanol are added 15 parts of NH₃-saturated ethanol and the resulting mixture is autoclaved at 130° C. for 24 hours. Then, it is concentrated to a small volume and diluted with water. The precipitated product is filtered out, and crystallized from MeOH to give 0.22 part estra-1,3,5(10)-triene-17β-ol-[3,2-d]-6'-amino - pyrimidine-17-acetate, M.P. 306° C.; [α]$_D$=+56° (chloroform). 0.12 part estra-1,3,5(10)-triene-17β-ol-[3,2-d]-6'-aminopyrimidine-17-acetate are refluxed for 1 hour with 10 parts 1% potash methanolic solution. After concentration, neutralization with 15% acetic acid and dilution with water, there are obtained 0.092 part of product. This is crystallized from acetone-methylene chloride to give 0.071 part estra-1,3,5(10)-triene-17β-ol-[3,2-d]-6'-amino pyrimidine, M.P. 360–362° C.; [α]$_D$=+59° (pyridine).

Example 3.—17α-ethynyl-estra-1,3,5(10)-triene-17α-ol-[3,2-d]-6'-amino-pyrimidine To a solution of 2 parts 2-cyano-3-(N-ethoxymethyliden)-amino-17α-ethynyl-estra-2,4-diene-17β-ol in 15 parts absolute ethanol are added 15 parts of an NH₃-saturated ethanol solution and the resulting mixture is autoclaved at 120° C. After 24 hours it is cooled, the precipitated product is filtered out, and crystallized to give 1.65 parts 17α - ethynyl-estra - 2,4 - diene-17β-ol-[3,2-d]-6'-amino-pyrimidine; λ$_{max}$ 244, 310 mμ (ε 14.000, 6.000);

$$\lambda_{max.}^{EtOH/HCl}\ 252,\ 3\ \mu 31m\ (\epsilon\ 14.600,\ 6.600)$$

1.05 parts of this compound are dissolved in 30 parts dry dioxane; to the solution there are added 1.2 parts 10% Pd/C and 0.5 part methyl maleate and the whole is refluxed for 48 hours. The catalyst is filtered off, the filtrate is evaporated to dryness, the dry solid is leached with hexane and the residue is crystallized from methanol to give 0.72 part 17α-ethynyl-estra-1,3,5(10)-triene-17β-ol-[3,2-d]-6'-amino-pyrimidine.

Example 4.—19-nor-cholesta-1,3,5(10)-triene-[3,2-d]-6'-hydroxy-pyrimidine

By operating in a current of very pure nitrogen, a solution of 5.3 parts 19-nor-cholest-4-en-3-one in 30 parts methyl carbonate is refluxed for 2 hours with 3.07 parts freshly prepared sodium methylate. Then, it is diluted with chloroform, acidified with 2 N sulfuric acid and the organic phase is separated. After washing the latter with water to neutrality, evaporating the solvent and chromatographing on silica gel, there are obtained 0.86 part 2-carbomethoxy-19-nor-cholest-5(10)-en-3-one (fract. hexane sulfuric ether 95:5); λ$_{max}$ 256 mμ, ε 8.000, from 3.2 parts 2α-carbomethoxy-19-nor-cholesta-4-en-3-one (λ$_{max}$ 242 mμ, ε 15.500), positive test with FeCl₃, and 0.51 part 4α-carbomethoxy-19-nor-cholesta-4-en-3-one.

2.5 parts 2α - carbomethoxy-19-nor-cholest-4-en-3-one, dissolved in 80 parts dry methanol, are refluxed for 4 hours with 3.2 parts ammonium formate, and evaporated to dryness. To the semicrystalline residue is added warm water and filtered. The thus obtained crude product is crystallized from methanol to give 1.85 parts 2-carbomethoxy-3-amino-19-nor-cholesta-2,4-diene; λ$_{max}$ 232, 343 mμ (ε 14.770 and 7.500). This product is dissolved in 15 parts ethyl ortho-formate and refluxed for 6 hours. The solution is evaporated to dryness and the residue 2-carbomethoxy - 3(N - ethoxymethylidenamino) - 19 - nor-cholesta-2,4-diene, without further purification, is heated in autoclave to 120° C. for 12 hours with 25 parts of an NH₃-saturated ethanol solution. Then, it is concentrated and the crystalline product (0.92 part) is filtered out; it is 19-nor-cholesta-2,4-diene-[3,2-d]-6'-hydroxypyrimidine. This compound is dissolved in dioxane and is refluxed for 48 hours with 1.05 parts ethyl maleate. The catalyst is filtered off, the filtrate is evaporated to dryness and is crystallized from ethyl ether to give 0.55 part 19-nor-cholesta-1,3,5(10)-triene-[3,2-d]-6'-hydroxy-pyrimidine.

Example 5.—19-nor-cholesta-1,3,5(10)-triene-[3,2-d]-2',6'-dihydroxy-pyrimidine 2.5 parts 2-carbomethoxy-3-amino-19-nor-cholesta-2,4-diene are dissolved in 75 parts dry toluene and, by operating in a nitrogen atmosphere and under stirring, treated with 5 parts finely divided K₂CO₃ and 2.5 parts methyl chlorocarbonate. The mixture is stirred for 12 hours, the inorganic residue filtered off; the organic extracts are washed with water, alkali and water to neutrality and evaporated to dryness. The residue is crystallized from methanol to give 2.46 parts 2-carbomethoxy-3-(N-methoxycarboylamino) - 19 - nor-cholesta-2,4-diene. 1.6 parts of this compound are dissolved in 25 parts dioxane and there is added a solution of 0.85 part 2,3-dicyano-5,6-dichlorobenzoquinone in dioxane. After 10 minutes the solution is diluted with CH₂Cl₂, the precipitated hydroquinone is filtered off and the filtrate is percolated through an alumina column. By evaporating the dioxane-methylene chloride fractions and crystallizing with MeOH there was obtained 1.15 parts 2-carbomethoxy-3-(N-methoxycarboylamino)-19-nor-cholesta - 1,3,5(10) - triene which is dissolved in absolute ethanol. The solution is saturated with gaseous ammonia, placed in an autoclave and heated at 140° C. for 18 hours, cooled, concentrated under vacuum and the separated crystalline product is filtered out and crystallized from ethyl acetate —CH₂Cl₂ to give 0.87 part 19 - nor-cholesta-1,3,5(10)-triene-[3,2-d]-2',6'-dihydroxy-pyrimidine.

Example 6.—19-nor-cholesta-1,3,5(10)-triene-[3,2-d]-2',6'-diethoxy-pyrimidine

A solution of 2.96 parts 19-nor-cholesta-1,3,5(10)-triene - [3,2 - d] - 2',6'-dihydroxy-pyrimidine in 40 parts POCl₃ and 10.4 parts diethylaniline is refluxed for 20 hours. Then, 30 parts of the solvent mixture is distilled off, and the residue is poured into 200 parts finely ground ice, left under stirring for 2 hours, and the obtained suspension is well extracted with ethyl acetate. The organic phases are washed with water to neutrality, evaporated under vacuum to obtain 2.22 parts 19-nor-cholesta-1,3,5(10)-triene-[3,2-d]2',6'-dichloro-pyrimidine. Two parts of this compound are dissolved in 20 parts absolute ethanol and refluxed with a solution of 0.4 part sodium in absolute ethanol, concentrated, diluted with water and filtered to give, after crystallization, 1.52 parts 19-nor-cholesta-1,3,5(10)-triene-[3,2-d]-2',6'-diethoxypyrimidine.

Example 7.—19-nor-cholesta-1,3,5(10)-triene-[3,2-d]-2',6'-diamino-pyrimidine

A solution of 2.15 parts 19-nor-cholesta-1,3,5(10)-triene-[3,2-d]-2',6'-dichloro-pyrimidine in 20 parts NH₃-saturated ethanol is kept for 12 hours in an autoclave at 120° C., cooled, evaporated to dryness and chromatographed on alumina. From the hexane:chloroform 3:7 and 9:1 eluates there are obtained 0.27 part 19-nor-cholesta - 1,3,5(10) - triene-[3,2-d]-2'-chloro-6'-amino-pyrimidine, and then, from CHCl₃ and chloroform-methanol, 0.97 part 19-nor-cholesta 1,3,5(10)-triene-[3,2-d]-2',6'-diamino-pyrimidine.

Example 8.—19-nor-pregna-1,3,5(10)-triene-20-one-[3,2-d]-pyrimidine

A solution of 2-hydroxymethylene-19-nor-pregna-4-en-3-one-20,20-diethylenedioxide in 20 parts formamide is treated at 170° C. under a light vacuum with 2 parts tris-formylamino-methane in the presence of catalytic amounts of p-toluensulfonic acid for 8 hours. Then, it is diluted with water, thoroughly extracted with $CHCl_3$. The chloroform extracts, after washing with alkali and water to neutrality, are evaporated to dryness and crystallized from acetone to give 1.06 parts 19-nor-pregna-4-en-20,20-diethylene dioxide-[3,2-d]-pyrimidine, which, by a treatment with methanol and sulfuric acid at 60° C. and successive neutralization, is transformed to 19-nor-pregna-4-en-20-one-[3,2-d]-pyrimidine. 0.330 part of this compound are dissolved in 10 parts dioxane and kept for 1 hour at room temperature with 0.24 part 2,3-dicyano-5,6-dichlorobenzoquinone (DDQ) dissolved in 5 parts dioxane. Then, it is diluted with methylene chloride, filtered on alumina and evaporated to dryness. The residue is dissolved in ethyl acetate and extracted with alkali. The organic residue is washed with water to neutrality and evaporated to dryness to give 0.120 part 19-nor-pregna-1,3,5(10)-triene-[3,2-d]-pyrimidine.

Example 9.—Estra-1,3,5(10)-triene-17β-ol-[3,2-d]-2'-hydroxypyrimidine 7.5 parts of an Ni-Al (50/50) alloy are stirred for 40 minutes with 150 parts 2 N NaOH, decanted from the supernatant, and washed twice with water. To the so prepared moist catalyst there is added a solution of 3.25 parts 2-cyano-3-amino-estra-1,3,5(10)-triene-17β-ol-17-acetate in 75 parts 100% formic acid. It is stirred for 30 minutes at 70–80° C., the mixture is filtered, diluted with a solution of $NaHCO_3$, and extracted with sulfuric ether. The ethereal extracts are evaporated to dryness and after careful crystallization, there are separated 0.92 part 2 - formyl - 3 - amino-estra-1,3,5(10)-triene-17β-ol-17-acetate.

0.75 part of this compound is treated with methyl chlorocarbonate, by operating as in Example 5, and, after crystallization from methanol, there is obtained 0.63 part 2 - formyl - 3(N-methoxycarboyl-amino)-estra-1,3,5-(10)-triene-17β-ol-17-acetate.

From 0.40 part of this compound in 15 parts ammonia-saturated ethanol, by heating in an autoclave for 12 hours at 120° C., there is obtained, after concentration, 0.18 part estra-1,3,5(10)-triene-17β-ol-[3,2-d]-2'-hydroxypyrimidine-17-acetate. By saponification of 0.1 part of this compound with 15 parts 1% potash methanolic solution for 1 hour, under reflux, neutralization with 15% acetic acid, concentration and dilution with water, there is obtained 0.046 part estra-1,3,5(10)-triene-17β-ol-[3,2-d]-2'-hydroxypyrimidine.

Example 10.—19-nor-pregna-1,3,5(10)-triene-17α,21-diol-20-one-[3,2-d]-2',6'-dihydroxypyrimidine-21-acetate A solution of 17α-20:20,21-bis-methylenedioxy-19-nor-pregna-4-en-3-one in 50 parts dimethyl carbonate is refluxed in a nitrogen current for 2 hours in the presence of 4 parts Na methylate. Then, it is cooled, diluted with chloroform, and the organic phase is treated with monosodium phosphate saturated solution, then washed with water to neutrality and chromatographed on (acid) $Al_2O_3$. From the 6:4 benzene-sulfuric ether fractions there are obtained 3.2 parts 2α-carbomethoxy-17α,20:20,21-bis-methylenedioxy-19-nor-pregna-4-en-3-one which is reacted first with 60% formic acid, then with a sodium methylate methanolic solution and then with pyridine and acetic anhydride to give 1.92 parts 2α-carbomethoxy-19-nor - pregna - 4 - en - 17α - 21 - diol - 3,20 - dione - 21-acetate. This compound (1.8 parts) is refluxed for 4.5 hours in absolute ethanol with 1.25 parts ammonium formate. The solution is evaporated to dryness, and the residue is taken up with $CH_2Cl_2$, washed with water to neutrality and evaporated to give 1.83 parts crude 2-carbomethoxy - 3 - amino - 19 - nor - pregna - 2,4 - dien - 17α-21-diol-20-one-21-acetate. This crude compound is dissolved in 20 parts dry dioxane, 1.5 parts 15% Pd/C and 0.92 part diethyl maleate are added and the mixture is refluxed for 48 hours. Then, the catalyst is filtered off, and the filtrate is concentrated to dryness. After purification with hexane and chromatography through a column of silica gel, there are obtained 1.26 parts 2-carbomethoxy-3 - amino - 19 - nor - pregna - 1,3,5(10) - triene - 17α-21-diol-20-one-21-acetate.

1.2 parts of the above prepared 2-carbomethoxy-3-amino-triene are dissolved in toluene (50 parts). By operating in $N_2$ atmosphere and under stirring, 2.4 parts finely powdered $K_2CO_3$ and 1.25 parts methyl chlorocarbonate are added to the solution. After 8 hours, the salts are filtered off, the filtrate is washed with water to neutrality, and evaporated to dryness. Crystallization from ethyl ether gives 1.08 parts 2-carbomethoxy-3-(N-ethoxycarboyl-amino) - 19 - nor - pregna - 1,3,5(10) - triene - 17α,21-diol-20-one-21-acetate. A solution of 1 part of this compound in 25 parts ethanol is heated in an autoclave for 6 hours with 10 parts of a 25% $NH_3$ solution in 90% ethanol. The solution is concentrated and the crystallized product is filtered out. By recrystallization from acetone there is obtained 0.22 part 19-nor-pregna-1,3,5(10)-triene-17α, 21 - diol - 20 - one - [3,2 - d] - 2',6' - dihydroxypyrimidine-21-acetate, M.P. >315° C.

Example 11.—19-nor-pregna-1,3,5(10)-triene-21 - ol - 20-one - [3,2 - d] - 6' - hydroxypyrimidine - 17α - (2'-tetrahydropyranyloxy)-21-acetate 2.5 parts 2-carbomethoxy-3-amino-19-nor-pregna-1,3,5-(10)-triene-17α,21-diol-20-one-21 - acetate are refluxed with 15 parts freshly distilled ethyl ortho-formate. Then it is evaporated to dryness and the residue is triturated with methanol to give 2.52 parts 2-carbomethoxy-3-(N-ethoxymethylideneamino) - 19 - nor - pregna - 1,3,5(10)-triene-17α,21-diol-20-one-21-acetate. This compound is treated in benzene solution (25 parts) with 2 parts 2,3-dihydropyrane and 0.15 part dry p-toluenesulfonic acid. After 3 hours at room temperature, the solution is neutralized with a solution of sodium methylate, washed with water, evaporated to dryness and crystallized from methanol to give 1.92 parts 2-carbomethoxy-3(N-ethoxymethylideneamino) - 19 - nor - pregna - 1,3,5(10) - triene - 21-ol - 20 - one - 21 - acetate - 17α - (2' - tetrahydropyranyloxy). From this compound, when heated in an autoclave at 90° C. for 6 hours with 20 parts of a 3.5% $NH_3$ ethanol solution, after concentration, filtration and recrystallization, there is obtained 0.57 part 19-nor-pregna-1,3,5-(10) - triene - 21 - ol - 20 - one - [3,2 - d] - 6' - hydroxypyrimidine-17α-(2'-tetrahydropyranyloxy)-21-acetate.

Example 12.—17α-methyl-estra-1,3,5(10)-triene-17β-ol-[3,2-d]-6'-methyl-pyrimidine A solution of 2 parts 2α-acetyl-17α-methyl-19-nor-testosterone in 20 parts formamide is heated at 170° C. with 1.8 parts tris-formyl-amino-methane in the presence of 0.2 part p-toluensulfonic acid under a light vacuum for 8 hours. Then it is diluted with water, extracted with $CHCl_3$, and the organic extracts are washed repeatedly with alkali and water to neutrality. By evaporating the solvent and crystallizing from acetone, there are obtained 1.06 parts 17α - methyl - estra - 2,4 - diene - 17β - ol - [3,2 - d] - 6'-methyl-pyrimidine. One part of this product, dissolved in 25 parts dioxane, is refluxed with 0.8 part diethyl maleate and 1.2 parts 10% Pd/C. After 48 hours it is filtered, evaporated to dryness and chromatographed on alumina to give (from benzene-ether 2:3) 0.75 part 17α-methyl-estra - 1,3,5(10 - triene - 17β - ol - [3,2 - d] - 6' - methyl-pyrimidine.

Example 13.—Estra-1,3,5-(10)-triene-17β-ol-[3,2-d]-2'-phenyl-6'-methyl-pyrimidine-17-acetate 1 part 2α-acetyl-19-nor-testosterone-17-acetate in 15 parts formamide is reacted with 0.5 part benzamidine at 150° C. for 4 hours in the presence of 0.05 part p-toluensulfonic acid. The solution is concentrated under vacuum, diluted with water, and well extracted with CHCl₃. The chloroform extracts are repeatedly washed with alkali, then with water to neutrality. Then it is evaporated to dryness and the residue is chromatographed on alumina. From the 3:7 petroleum ether-benzene fractions, there is obtained 0.65 part estra-4-en-17β-ol-[2,3-d]-2'-phenyl-6'-methyl-pyrimidine-17-acetate. 0.5 part of this compound is refluxed in benzene with 0.6 part 10% Pd/C in the presence of 0.25 part diethyl maleate. After 48 hours, the catalyst is filtered off, the filtrate is concentrated to a small volume and allowed to be absorbed on an alumina column. From the benzene and 9:1 benzene-ethyl acetate fractions, there is obtained 0.32 part estra-1,3,5(10)-triene-17β-ol-[3,2-d]-2'-phenyl-6'-methyl-pyrimidine.

Example 14.—Estra-1,3,5(10)-triene-17β-ol-[3,2-d]-6'-hydroxypyrimidine-17-acetate A solution of 2 parts 2α-cyano-19-nor-testosterone-17-acetate in 50 parts ethanol is refluxed with 0.6 part hydroxylamine hydrochloride dissolved in 2.5 parts H₂O. After 2 hours, it is concentrated to a small volume, extracted with methylene chloride, washed with water to neutrality and evaporated to dryness to give, after crystallization, 1.22 parts estra-4-en-17β-ol-[3,2-c]-5'-amino-isoxazole-17-acetate M.P. 229–230° C., [α]_D = —2° (chloroform); λ_max 228, 286, mμ (ε=15.000, 4.500).

1 part of this compound in 25 parts dioxane is refluxed in the presence of 1.2 parts 10% Pd/C and 0.12 part styrene. After 48 hours, the catalyst is filtered off, the filtrate is evaporated to dryness, and the residue chromatographed on alumina to give (from the 95:5 ethyl-acetate-hexane fractions) 0.52 part 2-carboxy-amido-3-amino-estra-1,3,5(10)-triene-17-ol-17-acetate M.P. 261–263° C.; λ_max 222, 280, 290, 338 (lg. ε 4.40, 3.96, 3.23, 3.46).

From 0.35 part of this compound, refluxed with 10 parts ethyl ortho-formate for 8 hours, evaporated to dryness, and crystallized from acetone, there was obtained 0.26 part estra-1,3,5(10)-triene-17β-ol-[3,2-d]-6' hydroxy-pyrimidine-17-acetate.

Example 15.—17α-ethynyl-estra-1,3,5(10)-triene-17β-ol-[3,2-d]-6'-mercapto-pyrimidine 8 parts 2 cyano-3-ethoxymethylideneamino-17α-ethynyl-estra-1,3,5(10)-triene-17β-ol are treated with 100 parts of a 1.5 N sodium hydrosulfide solution in dry ethanol. The reaction mixture is refluxed for 10–12 hours, concentrated, diluted with warm water and decolorized with charcoal. After filtration of the solution, it is acidified with acetic acid. The precipitated product is filtered out, dried and crystallized from acetone-methanol to give 4.8 parts 17α-ethynylestra-1,3,5(10)-triene-17β-ol-[3,2-d]-6'-mercapto-pyrimidine, M.P. >360° C. In an analogous manner, by starting with the corresponding 2-cyano-3-ethoxy-methylidene-amino derivatives, the following products were prepared:

estra-1,3,5(10)-triene-17β-ol-[3,2-d]-6'-mercapto-pyrimidine
17α-methyl-estra-1,3,5(10)-triene-17β-ol-[3,2-d]-6'-mercapto-pyrimidine
17α-ethylestra-1,3,5(10)triene-17β-ol-[3,2-d]-6'-mercapto-pyrimidine
17α-vinyl-estra-1,3,5(10)-triene-17β-ol-[3,2,d]-6'-mercapto-pyrimidine
19-nor pregna-1,3,5(10)-triene-17α-ol-20-one-[3,2-d]-6'-mercapto-pyrimidine
6α-16β-dimethyl-19-nor pregna-1,3,5(10)-triene-11β,17α,21-triol-20-one-[3,2-d]-6'-mercapto-pyrimidine
6α,16β-dimethyl-17α,20:20,21-bismethylene-dioxy-19-nor pregna-1,3,5(10)-triene-11β-hydroxy-[3,2-d]-6'-mercapto-pyrimidine

Example 16.—17α-methyl-estra-1,3,5(10)-triene-17β-ol-[3,2-d]-2'-hydroxy-6'-mercaptopyrimidine 3.2 parts 2-cyano-3-ethoxycarboylamino-17α-methyl-estra-1,3,5(10)-triene-17β-ol are refluxed for 15 hours with 45 parts of a solution of 1.5 N sodium hydrosulfide. The solution is decolorized hot with charcoal, concentrated and acidified with acetic acid. 2.65 parts of a product precipitates, which, after filtration and crystallization from isopropyl alcohol gives 2.12 parts 17α-methyl-estra-1,3,5 (10)-trien-17β-ol-[3,2-d]-2'-hydroxy-6'-mercapto-pyrimidine, M.P. >350° C.

In an analogous manner, by starting with the corresponding 2-cyano-3-alkoxy-carboyl-derivatives, the following compounds were prepared:

estra-1,3,5(10)-triene-17β-ol-[3,2-d]-2'-hydroxy-6'-mercapto-pyrimidine
17α-ethynyl-estra-1,3,5(10)-triene-17β-ol-[3,2-d]-2'-hydroxy-6'-mercapto-pyrimidine
17α-vinyl-estra-1,3,5(10)-triene-17β-ol-[3,2-d]-2'-hydroxy-6'-mercapto-pyrimidine
17α-ethyl-estra-1,3,5(10)-triene-17β-ol-[3,2-d]-2'-hydroxy-6'-mercapto-pyrimidine
19-nor pregna-1,3,5(10)-triene-17α-ol-20-one-[3,2-d]-2'-hydroxy-6'-mercapto-pyrimidine
6α,16β-dimethyl-17α,20:20,21-bis-methylene-dioxy-19-nor pregna-1,3,5(10)-triene-11β-hydroxy-[3,2-d]-2'-hydroxy-6'-mercapto-pyrimidine
6α,16β-dimethyl-19-nor pregna-1,3,5(10)-triene-11β,17α,21-triol-20-one-[3,2-d]-2'-hydroxy-6'-mercapto-pyrimidine

We claim:
1. A compound of the formula

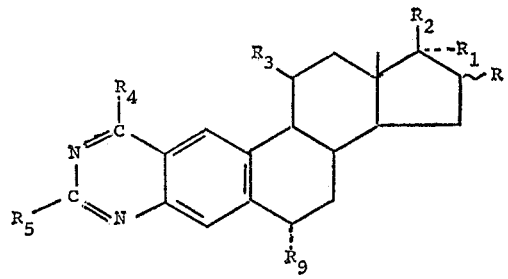

wherein R is a member selected from the group consisting of H and alkyl of 1–3 carbon atoms; R₁ is singly a member selected from the group consisting of H, lower alkyl, lower alkenyl, lower alkynyl, hydroxy, and 2'-tetrahydropyranyloxy; R₂ is singly a member selected from the group consisting of hydroxy, lower alkanoyloxy, —C₈H₁₇, —COCH₃, —COCH₂OH, —COCH₂O-acyl in which acyl is lower alkanoyl; R₁ and R₂ together are 17α,20:20,21-bis-methylenedioxy; R₃ is a member selected from the group consisting of H and hydroxy; R₄ and R₅ are each a member selected from the group consisting of H, lower alkyl, phenyl, benzyl, hydroxy, mercapto, amino, lower alkoxy and chloro; and R₉ is a member selected from the group consisting of H and methyl.

2. A process for the preparation of a compound as claimed in claim 1, comprising dehydrogenating and aromatizing the 2-ene or 2,4-diene analog of said compound by reaction with a hydrogen acceptor selected from the group consisting of stilbene, styrene, and the methyl and ethyl esters of cinnamic, fumaric and maleic acids in the presence of a hydrogen transfer agent selected from the group consisting of Pd/C and Pt/C and in a solvent selected from the group consisting of dioxane, benzene, xylene, iso-octane and mineral oil.

3. A process for the preparation of a compound as claimed in claim 1, comprising dehydrogenating and aromatizing the 2-ene or 2,4-diene analog of said compound by reaction with a quinone selected from the group consisting of quinone, 2,3-dicyano-5,6-dichloro-benzoquinone and tetrachlorobenzoquinone.

4. A process as claimed in claim 3 in which said reaction is carried out in the presence of a hydrogen transfer agent selected from the group consisting of Pd/C and Pt/C.

5. A process for preparing a compound of the formula

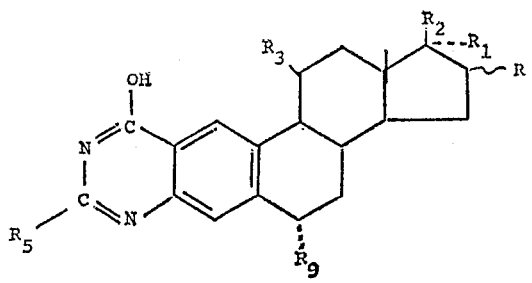

wherein R, $R_1$ and $R_2$, singly and together, $R_3$ and $R_9$ have the meanings given in claim 1 and $R_5$ is a member selected from the group consisting of H and lower alkyl, comprising refluxing a compound of the formula

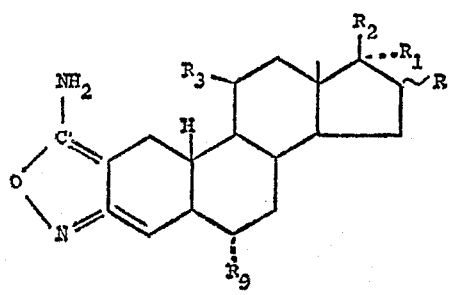

wherein R, $R_1$ and $R_2$, singly and together, $R_3$ and $R_9$ have the meanings given above with a hydrogen transfer agent selected from the group consisting of Pd/C and Pt/C in a solvent selected from the group consisting of dioxane, benzene, xylene and isooctane to give a compound of the formula

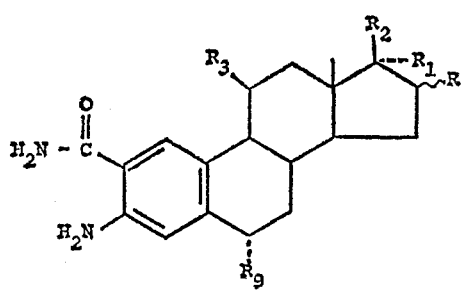

wherein R, $R_1$ and $R_2$, singly and together, $R_3$ and $R_9$ have the meanings given above, and reacting said last-mentioned compound with a member selected from the group consisting of methyl ortho-formate, ethyl ortho-formate, ethyl ortho-acetate and an ortho-ethyl ester of a saturated monocarboxylic acid having 3 to 6 carbon atoms.

6. A process as claimed in claim 5 in which said refluxing with said hydrogen transfer agent is carried out in the presence of a hydrogen acceptor selected from the group consisting of styrene and ethyl maleate.

7. A process for preparing a compound of the formula

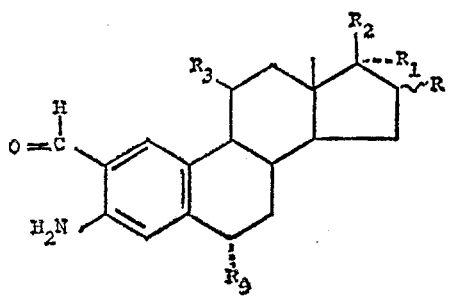

wherein R, $R_1$ and $R_2$, singly and together, $R_3$ and $R_9$ have the meanings given in claim 1, comprising reacting a compound of the formula

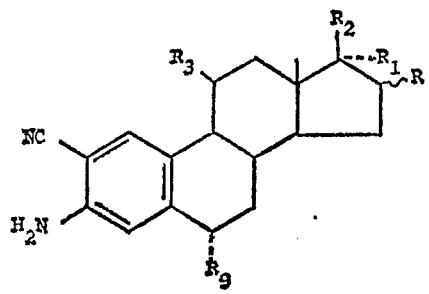

wherein R, $R_1$ and $R_2$, singly and together, $R_3$ and $R_9$ have the meanings given above with Raney Ni in 100% formic acid.

8. A process for preparing a compound of the formula

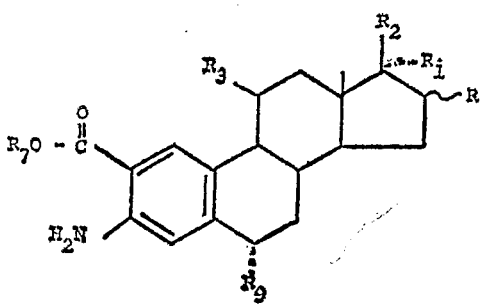

wherein R, $R_1$ and $R_2$, singly and together, $R_3$ and $R_9$ have the meanings given in claim 1 and $R_7$ is lower alkyl, comprising reacting a compound of the formula

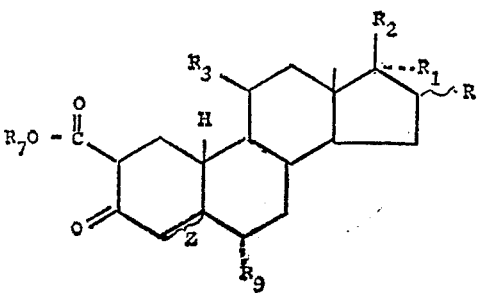

wherein R, R₁ and R₂, singly and together, R₃, R₇ and R₉ have the meanings given above and Z is a member selected from the group consisting of a single and a double bond with ammonium formate in ethanol to give a compound of the formula

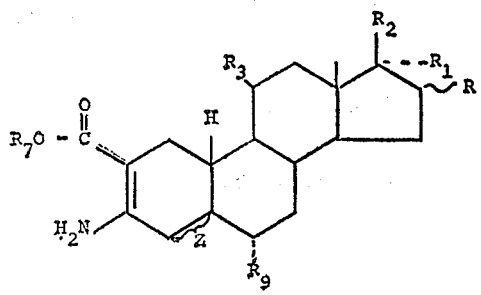

wherein R, R₁ and R₂, singly and together, R₃, R₇, R₉ and Z have the meanings given above, and reacting said last-mentioned compound with a hydrogen acceptor selected from the group consisting of tetrachlorobenzoquinone, 2,3-dicyano-5,6-dichlorobenzoquinone, ethyl maleate, styrene and stilbene in a solvent selected from the group consisting of dioxane, acetone, benzene, xylene and isooctane.

9. A process as claimed in claim 8 in which said reaction with said hydrogen acceptor is carried out in the presence of a hydrogen transfer agent selected from the group consisting of Pd/C and Pt/C.

10. A compound of the formula

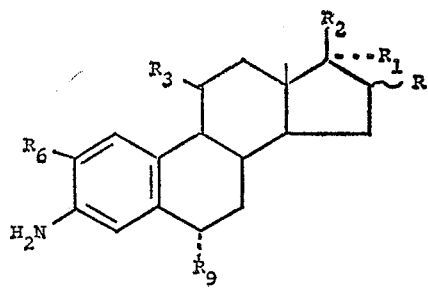

wherein R is a member selected from the group consisting of H and alkyl of 1–3 carbon atoms; R₁ is singly a member selected from the group consisting of H, lower alkyl, lower alkenyl, lower alkynyl, hydroxy and 2′-tetrahydropyranyloxy; R₂ is singly a member selected from the group consisting of hydroxy, lower alkanoyloxy, —C₈H₁₇, —COCH₃, —COCH₂OH, —COCH₂O-acyl in which acyl is lower alkanoyl; R₁ and R₂ together are 17α,20:20,21-bis-methylenedioxy; R₃ is a member selected from the group consisting of H and hydroxy; R₆ is a member selected from the group consisting of formyl, carboxy-amide, —COOR_a in which R_a is lower alkyl and —COCH₃; and R₉ is a member selected from the group consisting of H and methyl.

11. A process for the preparation of a compound of the formula

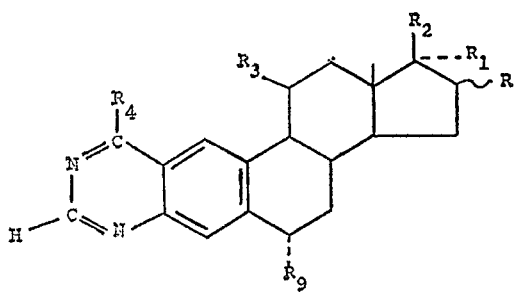

wherein R, R₁ and R₂, singly and together, R₃ and R₉ have the meanings given in claim 10 and R₄ is a member selected from the group consisting of —NH₂ and —OH, comprising refluxing a compound as claimed in claim 10 with ethyl ortho-formate to give a compound of the formula

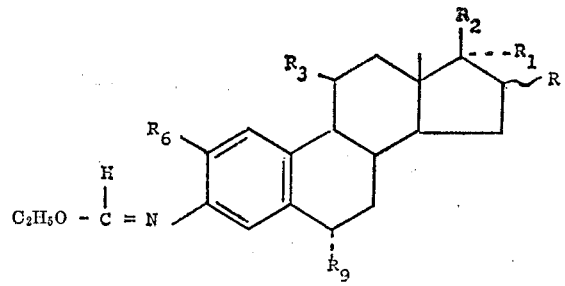

wherein R, R₁ and R₂, singly and together, R₃, R₆ and R₉ have the meanings given in claim 10, and autoclaving said last-mentioned compound with ammonia in ethanol.

12. A process for the preparation of a compound of the formula

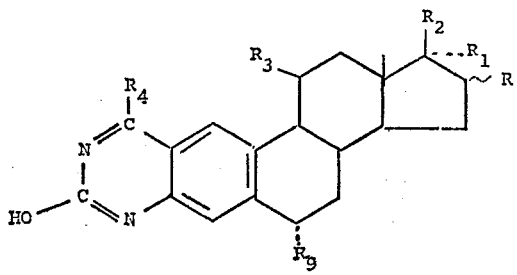

wherein R, R₁ and R₂, singly and together, R₃ and R₉ have the meanings given in claim 10 and R₄ is a member selected from the group consisting of —NH₂ and —OH, comprising reacting a compound as claimed in claim 10 with a member selected from the group consisting of methyl chlorocarbonate and ethyl chlorocarbonate in at least one dry solvent selected from the group consisting of dioxane, acetone, benzene, toluene and xylene in the presence of a base selected from the group consisting of K₂CO₃, Na₂CO₃, CaCO₃ and CaO to give a compound of the formula

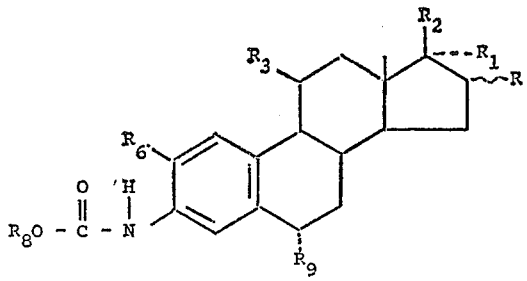

wherein R, R₁ and R₂, singly and together, R₃, R₆ and R₉ have the meanings given in claim 10 and R₈ is a member selected from the group consisting of methyl and ethyl, and autoclaving said last-mentioned compound with ammonia in ethanol.

13. A process for the preparation of a compound of the formula

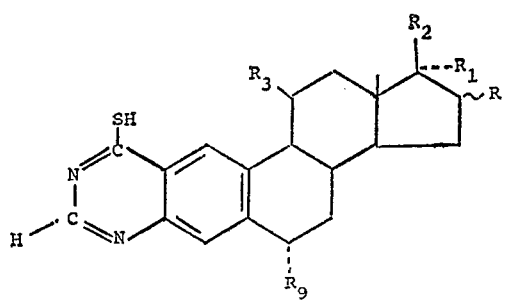

wherein R, $R_1$ and $R_2$, singly and together, $R_3$ and $R_9$ have the meanings given in claim 10, comprising refluxing a compound of the formula

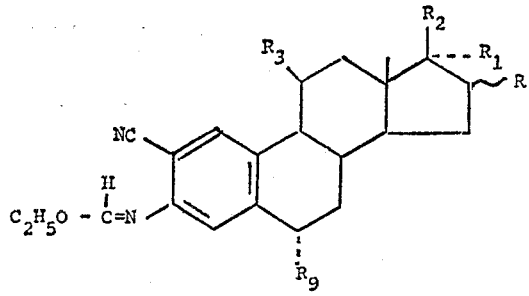

wherein R, $R_1$ and $R_2$, singly and together, $R_3$ and $R_9$ have the meanings given above with a compound selected from the group consisting of KHS and NaHS in at least one dry alcohol selected from the group consisting of methanol, ethanl, n-propanol, i-propanol and n-butanol.

14. A process for the preparation of a compound of the formula

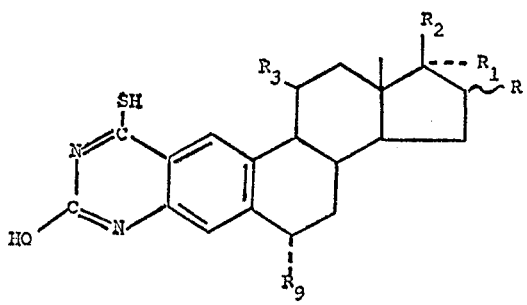

wherein R, $R_1$ and $R_2$, singly and together, $R_3$ and $R_9$ have the meanings given in claim 10, comprising refluxing a compound of the formula

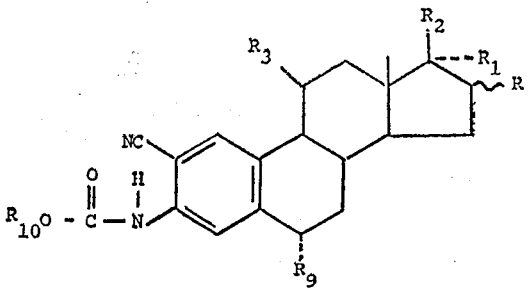

wherein R, $R_1$ and $R_2$, singly and together, $R_3$ and $R_9$ have the meanings given above and $R_{10}$ is a member selected from the group consisting of methyl and ethyl with a compound selected from the group consisting of KHS and NaHS in at least one dry alcohol selected from the group consisting of methanol, ethanol, n-propanol, i-propanol and n-butanol.

No references cited.

HENRY A. FRENCH, Primary Examiner

U.S. Cl. X.R.

260—239.55, 397.3, 397.4, 397.45, 397.47, 397.5, 999